United States Patent [19]

Sagawa et al.

[11] 3,770,966

[45] Nov. 6, 1973

[54] LIGHT AMPLIFIER FOR USE IN OPTICAL COMMUNICATION SYSTEM

[75] Inventors: Akio Sagawa, Hideaki; Hideaki Kawakami, Hitachi-shi, both of Japan

[73] Assignee: Hitachi, Ltd., Tokyo, Japan

[22] Filed: July 26, 1972

[21] Appl. No.: 275,160

[52] U.S. Cl. ......... 250/205, 250/213 R, 250/217 SS, 307/311

[51] Int. Cl. .............................................. G01j 1/32

[58] Field of Search ....................... 250/213, 217 SI, 250/217 SS, 205, 208, 209, 227; 307/311

[56] References Cited

UNITED STATES PATENTS

| | | | |
|---|---|---|---|
| 3,210,549 | 10/1965 | Van Santen et al. | 250/217 SS X |
| 3,215,843 | 11/1965 | Neil | 250/205 |
| 3,476,941 | 11/1969 | Bonin | 250/211 J |
| 3,493,761 | 2/1970 | Brightman | 250/205 X |
| 3,705,316 | 12/1972 | Burrous et al. | 307/311 |

*Primary Examiner*—Walter Stolwein
*Attorney*—Paul M. Craig, Jr. et al.

[57] ABSTRACT

A light amplifier comprising a first photo transistor for converting an optical input applied by way of an optical transmission line into an electrical signal, a comparator amplifier connected to the first photo transistor for receiving the output signal of the photo transistor as one of the two inputs thereto, a first and a second light emitting diode emitting light depending on the output current of the comparator amplifier, and a second photo transistor for converting the optical output signal of the first light emitting diode applied through a pair of polarizers into an electrical signal and applying this electrical signal in negative feedback fashion to the comparator amplifier as the other input thereto. The output current of the comparator amplifier is controlled so that coincidence is attained between the output signals of the photo transistors, and the optical output signal of the second light emitting diode is delivered to another optical transmission line as an amplified optical output.

9 Claims, 4 Drawing Figures

LIGHT AMPLIFIER FOR USE IN OPTICAL COMMUNICATION SYSTEM

BACKGROUND OF THE INVENTION

1. Field of the Invention

This invention relates to an interconnecting light amplifier for use in an optical communication system.

2. Description of the Prior Art

In an optical communication system utilizing transmission of light through a space or using an optical transmission line of, for example, optical fibers as a transmission medium, greater attenuation occurs in an optical signal being transmitted with the increase in the distance of transmission. Practically, attenuation of the order of, for example, 30 dB per kilometer occurs in an optical signal being transmitted by such an optical transmission system. Therefore, in order that an optical signal can be successfully transmitted substantially attenuation-free over a long distance especially by way of an optical transmission line, it is generally necessary to amplify the optical signal by an interconnecting light amplifier disposed substantially midway between a light transmitter and a light receiver.

Conventional light amplifiers of the kind above described have been such that a photo transistor converts an optical input from an optical transmission line into an electrical signal which is then amplified by an amplifier for energizing a light emitting diode and the optical output of the light emitting diode is applied to another optical transmission line, to be transmitted to a light receiver.

However, due to the marked temperature dependence of the light emitting diode and photo transistor, the operating characteristics of the conventional light amplifier have been adversely affected by variations in the ambient temperature, resulting in impossibility of stable amplification of the optical signal and in reductions in the reliability of transmission of the optical signal over a long distance.

SUMMARY OF THE INVENTION

It is a primary object of the present invention to provide a light amplifier which can carry out stable amplification of an optical signal without being adversely affected by environmental conditions.

Another object of the present invention is to provide a novel and improved light amplifier of simple circuitry which is not adversely affected by the ambient temperature and other environmental conditions.

The present invention is featured by the fact that a first light receiving element converts an optical input applied by way of an optical transmission line into an electrical signal to apply the same to a comparator amplifier as one of the two inputs thereto, while a second light receiving element converts a portion of an optical output signal of a light emitting element into an electrical signal to apply same in negative feedback fashion to the comparator amplifier as the other input thereto, and the comparator amplifier drives the light emitting element in such a manner that coincidence is attained between these two inputs.

The present invention is further featured by the fact that it includes, in addition to the first light emitting element provided for the negative feedback of the optical signal through the second light receiving element to the comparator amplifier, a second light emitting element which delivers an amplified optical output to another optical transmission line connected to a light receiver.

The present invention is further featured by the fact that the pair of the first and second light receiving elements are packaged so that these elements are placed under substantially the same thermal conditions, and the pair of the first and second light emitting elements are also packaged so that these elements are placed under substantially the same thermal conditions.

DESCRIPTION OF THE PREFERRED EMBODIMENTS

An optical transmission system to which the present invention is applied will be briefly described with reference to FIG. 1 before describing in detail a few preferred embodiments of the present invention.

Figure 1:
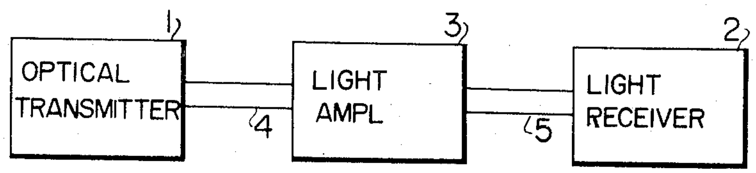
FIG. 1 is a block diagram of an optical transmission system to which the present invention is applied.

In the transmission of light over a long distance, especially in the transmission of light by way of optical transmission lines, a light amplifier 3 is disposed at a point substantially intermediate between a light transmitter 1 and a light receiver 2 as shown in FIG. 1 so that the light amplifier 3 amplifies an optical signal transmitted from the light transmitter 1 by way of an optical transmission line 4 and applies the amplified optical signal to the light receiver 2 by way of another optical transmission line 5.

Figure 2:
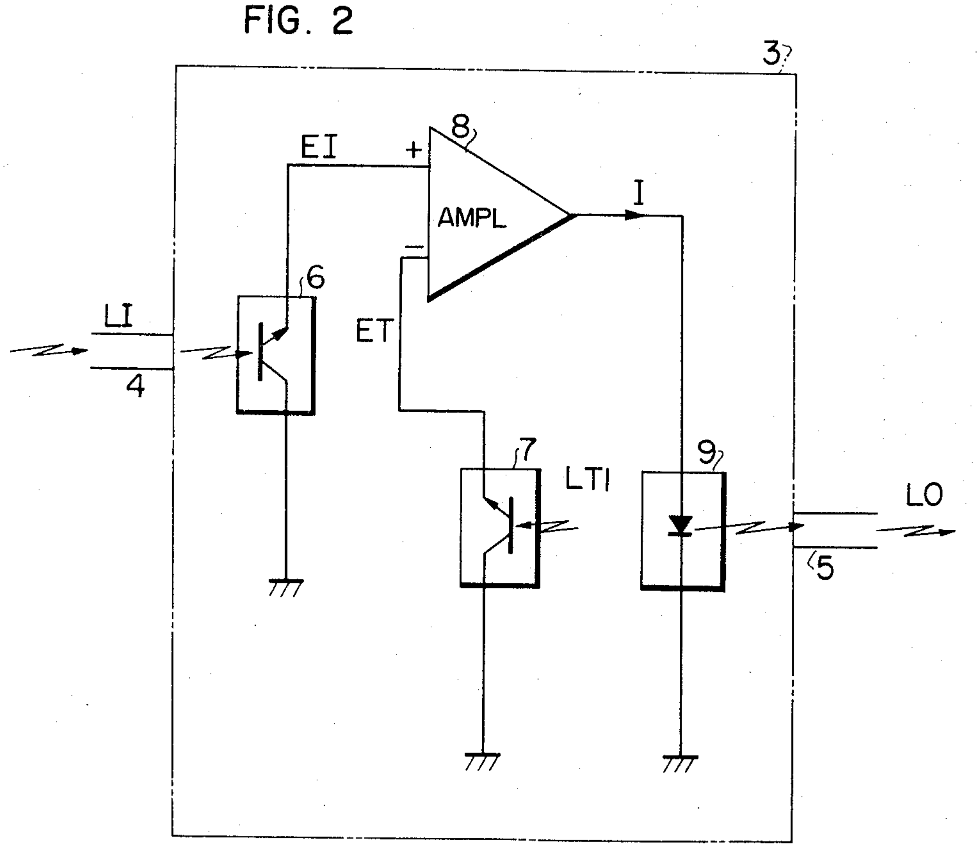
FIG. 2 is a circuit diagram showing the basis structure of an interconnecting light amplifier according to the present invention.

The present invention relates to improvements in the light amplifier 3 in such an optical transmission system. Referring to FIG. 2 showing the basic structure of an improved light amplifier 3 according to the present invention, an optical input LI is applied by way of the optical transmission line 4 to a light receiving element 6 which converts the optical input LI into an electrical signal EI. The output signal EI of the light receiving element 6 is applied to a comparator amplifier 8 to be compared with an electrical output signal ET of a light receiving element 7 described later. The output signal EI of the light receiving element 6 is applied to the positive input terminal of the comparator amplifier 8, while the output signal ET of the light receiving element 7 is applied to the negative input terminal of the comparator amplifier 8. A light emitting element 9 is connected to the output terminal of the comparator amplifier 8 and emits light the quantity of which is proportional to the output current I of the comparator amplifier 8. A portion LTI of the optical output signal of the light emitting element 9 is applied to the light receiving element 7 to be converted into the electrical signal ET. The remaining portion of the optical output signal of the light emitting element 9 is delivered as an amplified optical output LO to the optical transmission line 5.

The characteristics of the light receiving elements 6 and 7 are selected to be sustantially the same and the amplification factor of the comparator amplifier 8 is selected to be sufficiently high. The negative feedback is carried out in such a manner that the optical input LTI to the light receiving element 7 is always equal to the optical input LI to the light receiving element 6. Thus, when, for example, the optical input LTI to the light receiving element 7 is reduced to a level lower than the level of the optical input LI to the light receiving element 6, the relation EI>ET holds between the input voltages applied to the comparator amplifier 8 and the output current I of the comparator amplifier 8 driving the light emitting element 9 is increased until the ralation LTI ≈ LI is established between LII and LI.

More precisely, the optical inputs LI and LTI to the respective light receiving elements 6 and 7 are always controlled to give the relation shown in the following equation (1):

$$LI \approx LTI \ldots \quad (1)$$

Suppose now that the relation between the feedback component LTI and the output component LO of the optical output signal of the light emitting element 9 is selected to give the relation represented by the following equation (2):

$$LO = K \cdot LTI \ldots \quad (2)$$

The light amplification factor $K_o$ of the light amplifier 3 is given by the ratio between the optical input LI and the optical output LO, and the following equation holds:

$$K_o = LO/LI = K \cdot LTI/LI \approx K \ldots \quad (3)$$

It will thus be seen that the light amplification factor $K_o$ of the light amplifier 3 is substantially equal to K representing the ratio between the feedback component LTI and the output component LO of the optical output of the light emitting element 9, and a stable ouput can be reliably obtained. Variations in the light sensitive characteristics of the light receiving elements 6 and 7 due to temperature variations cancel each other and are compensated when these elements are of the same standards and are packaged so that they are placed under substantially the same thermal conditions.

Figure 3:
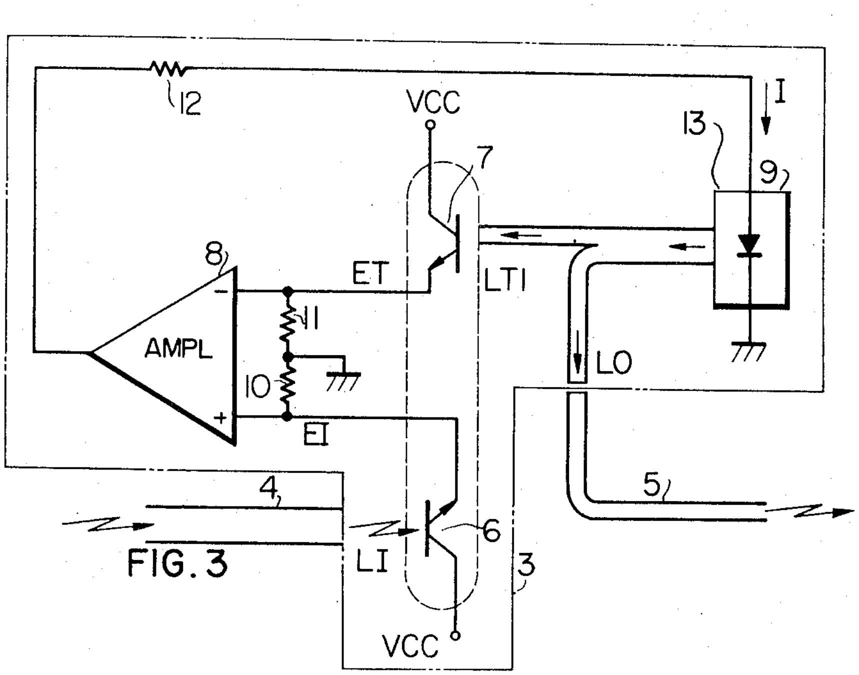
FIG. 3 is a circuit diagram showing one practical form of the light amplifier shown in FIG. 2.

A practical form of the light amplifier 3 according to the present invention is shown in FIG. 3. In FIG. 3, the light receiving elements 6 and 7 are in the form of photo transistors and the light emitting element 9 is in the form of a light emitting diode. The reference numerals 10 and 11 designate load resistors for the respective photo transistors 6 and 7. The reference numeral 12 designates a resistor connected in series with the light emitting diode 9. A glass fiber bundle 13 extending from the light emitting diode 9 is divided into two branch portions so as to apply the feedback component LTI and output component LO of the optical output signal to the photo transistor 7 and optical transmission line 5 rescpectively. A voltage source Vcc is provided for the photo transistors 6 and 7.

The dotted line surrounding the photo transistors 6 and 7 indicates the fact that these two photo transistors 6 and 7 are packaged so that they are placed under substantially the same thermal conditions. Light passing through a glass fiber is naturally subject to attenuation, and thus, the feedback component LTI and output component LO of the optical output signal of the light emitting diode 9 are subject to attenuation while passing through the glass fiber bundle 13. When, however, the lengths of the glass fiber bundle portions for transmitting the components LTI and LO are selected to be substantially equal to each other, attenuation occurs at substantially the same rate so that the light amplification factor $K_o$ of the light amplifier 3 can be substantially represented by the ratio between LTI and LO. While a glass fiber bundle has been employed in FIG. 3 for branching the optical output signal of the light emitting diode 9, a prism (not shown) may be employed in lieu of the glass fiber bundle for substantially equally effectively branching the optical output signal. The use of the glass fiber bundle or prism may be suitably selected by a user.

Figure 4:
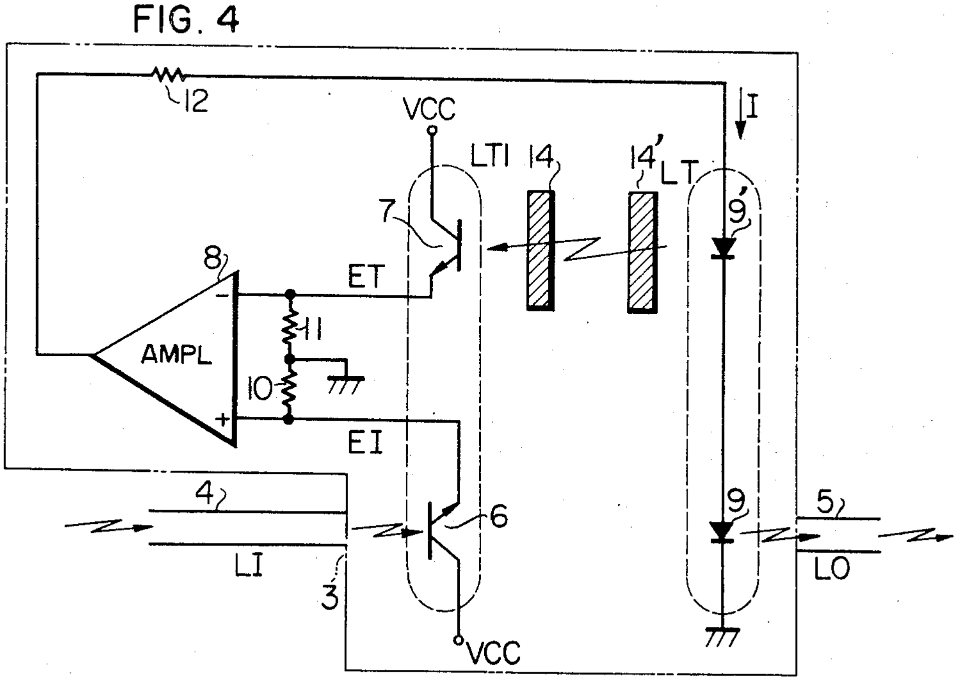
FIG. 4 is a circuit diagram showing another practical form of the light amplifier shown in FIG. 2.

FIG. 4 shows another practical form or a modification of the light amplifier 3 according to the present invention shown in FIG. 3. In FIG. 4, the light emitting diode 9 in FIG. 3 is replaced by a pair of light emitting diodes 9 and 9' connected in series, and a pair of spaced polarizers 14 and 14' are disposed between the light emitting diode 9' and the photo transistor 7 so that the optical output signal LT of the light emitting diode 9' is attenuated to LII to be applied as a negative feedback input to the comparator amplifier 8 and the optical output signal LO of the light emitting diode 9 is delivered to the optical transmission line 5 as an amplified optical output.

The light emitting diodes 9 and 9' are of the same type having the same characteristics. Thus, the optical output signals LT and LO of substantially the same quantity are delivered from the light emitting diodes 9 and 9' in response to the application of the output current I of the comparator amplifier 8. Therefore, the following relation holds between LT and LO:

$$LT \approx LO \ldots \quad (4)$$

Suppose that the attenuation factor of the polarizers 14 and 14' is K', then the following equation holds:

$$LTI = K' \cdot LT \ldots \quad (5)$$

From the equations (1) to (5), the light amplification factor $K_o$ of the light amplifier 3 is given by $$K_o = LO/LI \approx LT/LI = 1/LI \cdot LTI/K' \approx 1/K' \ldots \quad (6)$$

It will thus be seen that the light amplification factor $K_o$ of the light amplifier 3 is given by the reciprocal of the attenuation factor K' of the polarizers 14 and 14' and a stable output can be reliably obtained. Therefore, the light amplification $K_o$ of the light amplifier 3 can be suitably controlled by varying the attenuation factor K'. In the arrangement shown in FIG. 4, this can be easily realized by varying the relative positions of the two polarizers 14 and 14'.

The dotted line surrounding the light emitting diodes 9 and 9' indicates the fact that the light emitting diodes 9 and 9' are packaged so that they are placed under substantially the same thermal conditions for the purpose of compensation of variations of their characteristics due to temperature variations. When, for example, the optical input LI is constant and the light emission efficiency of the light emitting diode 9 is reduced due to a rise in the ambient temperature, the light emission efficiency of the light emitting diode 9' is also reduced correspondingly and the electrical input ET to the comparator amplifier 8 is also reduced. This results in appearance of a higher output from the comparator amplifier 8, and the driving current I supplied to the light emitting diodes 9 and 9' is increased to restore the optical output LO of the light emitting diode 9 to the original level. Thus, the light amplifier 3 can carry out stable amplification of light without being adversely affected by the ambient temperature. While a pair of polarizers have been employed in FIG. 4 for attenuating the optical output signal LT to LTI, a light attenuator (not shown) may be employed in lieu of the polarizers for equally effectively attenuating the optical output signal LT.

It will be understood from the foregoing description that the present invention provides a light amplifier including a negative feedback control loop in which a portion of an optical output signal delivered from a light emitting element is subjected to photoelectric conversion to be applied to a comparator amplifier as a negative input thereto, while an optical input applied from a light transmitter by way of an optical transmission line is subjected to photoelectric conversion to be applied to the comparator amplifier as a positive input thereto, and the comparator amplifier drives the light emitting element in such a manner that coincidence is attained between the negative and positive inputs. Therefore, the light amplifier can carry out stable amplification of light without being adversely affected by the ambient temperature and other environmetal conditions and ensures transmission of light with high precision over a long distance.

We claim:

1. A light amplifier comprising a first light receiving means for converting an optical input into an electrical signal, a comparator amplifier means connected to said first light receiving means for receiving the electrical output signal of said first light receiving means as one of two inputs thereto, a light emitting means connected to said comparator amplifier means for delivering an optical output signal in response to the application of the electrical output signal of said comparator amplifier means, and a second light receiving means disposed opposite to said light emitting means for converting a portion of the optical output signal of said light emitting means into an electrical signal and connected to said comparator amplifier means for applying the electrical signal in negative feedback fashion to said comparator amplifier means as the other input thereto, said comparator amplifier means driving said light emitting means in such a manner that coincidence is attained between the electrical output signals of said first and second light receiving means.

2. A light amplifier as claimed in claim 1, wherein said first and second light receiving means are packaged so that they are placed under substantially the same thermal conditions.

3. A light amplifier as claimed in claim 1, wherein a prism is provided for dividing the optical output signal of said light emitting means into two signal portions so as to apply one of the two signal portions to said second light receiving means and to derive the other signal portion as an amplified optical output.

4. A light amplifier as claimed in claim 1, wherein a glass fiber means consisting of two optical fiber portions is provided for dividing the optical output signal of said light emitting means into two signal portions so as to apply one of the two signal portions to said second light receiving means and to derive the other signal portion as an amplified optical output.

5. A light amplifier as claimed in claim 1, wherein said light emitting means comprises a first and a second light emitting elements, the optical output signal of said first light emitting element being applied to said second light receiving means to provide the negative feedback input to said comparator amplifier means, and the optical output signal of said second light emitting element being derived as an amplified optical output.

6. A light amplifier as claimed in claim 5, wherein the optical output signal of said first light emitting element is applied to said second light receiving means through a light attenuator.

7. A light amplifier as claimed in claim 5, wherein the optical output signal of said first light emitting element is applied to said second light receiving means through a pair of polarizers.

8. A light amplifier as claimed in claim 5, wherein said first and second light emitting elements are packaged so that they are placed under substantially the same thermal conditions.

9. A light amplifier comprising a first photo transistor (6) for converting an optical input (LI) applied by way of an optical transmission line (4) into an electrical signal (EI), a comparator amplifier (8) connected to said first photo transistor (6) for receiving the electrical output signal (EI) of said photo transistor (6) as one of two inputs thereto, a pair of a first and a second light emitting diodes (9, 9') connected in series to said comparator amplifier (8) for delivering optical output signals (LO, LT) in response to the application of the output current (I) of said comparator amplifier (8), and a second photo transistor (7) disposed opposite to said second light emitting diode (9') for converting a portion (LTI) of the optical output signal (LT) of said light emitting diode (9') applied through a pair of polarizers (14, 14') into an electrical signal (ET) and connected to said comparator amplifier (8) for applying the electrical signal (ET) in negative feedback fashion to said comparator amplifier (8) as the other input thereto, said comparator amplifier (8) driving said light emitting diodes (9, 9') in such a manner that coincidence is attained between the electrical output signals (EI, ET) of said photo transistors (6, 7), and the optical output signal (LO) of said first light emitting diode (9) being delivered to another optical transmission line (5) as an amplified optical output.

* * * * *